United States Patent [19]
Harris et al.

[11] Patent Number: 5,949,453
[45] Date of Patent: Sep. 7, 1999

[54] MIXED RESOLUTION PRINTING FOR COLOR AND MONOCHROME PRINTERS

[75] Inventors: Donald G. Harris, Escondido; Majid Azmoon, Poway; Gary M. Nobel, San Diego, all of Calif.

[73] Assignee: Hewlett-Packard Company, Palo Alto, Calif.

[21] Appl. No.: 08/145,261

[22] Filed: Oct. 29, 1993

[51] Int. Cl.[6] ................................................ B41J 2/21
[52] U.S. Cl. ................................................ 347/43; 347/50
[58] Field of Search ................................ 347/43, 37, 50, 347/40

[56] References Cited

U.S. PATENT DOCUMENTS

| | | | |
|---|---|---|---|
| 4,511,907 | 4/1985 | Fukuchi | 347/43 |
| 4,709,246 | 11/1987 | Piatt et al. | 347/40 |
| 4,750,009 | 6/1988 | Yoshimura | 347/43 |
| 4,864,328 | 9/1989 | Fischbeck | 347/43 |
| 5,012,257 | 4/1991 | Lowe et al. | 347/43 |
| 5,142,374 | 8/1992 | Tajika et al. | 347/15 X |
| 5,208,605 | 5/1993 | Drake | 347/40 |
| 5,376,958 | 12/1994 | Richtsmeier et al. | 347/40 |
| 5,404,020 | 4/1995 | Cobbs | 347/37 |
| 5,412,410 | 5/1995 | Rezanka | 347/40 |
| 5,512,923 | 4/1996 | Bauman | 347/43 |

FOREIGN PATENT DOCUMENTS

| | | | |
|---|---|---|---|
| A0401575 | 12/1990 | European Pat. Off. | B41J 2/21 |
| 0481829 | 4/1992 | European Pat. Off. | |
| 1216852 | 8/1989 | Japan | 347/40 |
| A01208143 | 8/1989 | Japan | B41J 3/04 |
| A01216852 | 8/1989 | Japan | B41J 3/04 |
| WO90/02925 | 3/1990 | WIPO | |
| WO91/08902 | 6/1991 | WIPO | |

OTHER PUBLICATIONS

IBM Technical Disclosure Bulletin, vol. 23, No. 7A, Dec. 1980, New York, US, pp. 2700–2702, "Dual reolution ink jet drum printer".

Patent Abstracts of Japan, vol. 18, No. 25 (M–1542), Jan. 14, 1994 & JP–A–05 261 941 (RICOH) Oct. 12, 1993 *abstract*.

Patent Abstracts of Japan, vol. 10, No. 286 (M–521) (2342) Sep. 27, 1986 & JP–A–61 104 856 (NEC) May 23, 1986 * abstract*.

Partial European Search Report, EP 94 30 7806, Feb. 16, 1995, The Hague, pp. 1–2.

*Primary Examiner*—David F. Yockey
*Attorney, Agent, or Firm*—Jerry R. Potts; David S. Romney

[57] ABSTRACT

A printer with mixed base resolution capabilities, having a higher resolution monochrome component such as black and lower resolution components such as cyan, magenta and yellow. The different resolution components are integrated into the same printing mechanism for composite printing of higher resolution black and lower resolution color at the same time. For increased throughput, a higher resolution black printhead has a wider swath.

31 Claims, 12 Drawing Sheets

1/300th inch nozzle pitch printhead could be used to create a 600 pixel/inch printout in the media-advance axis by changing the incremental advance distance of the media at the end of a swath and then employing a multi-pass print mode. As another example, a 1/300th inch nozzle pitch printhead could be used to create a 600 pixel/inch printout in the carriage scan axis by increasing the firing frequency of the printhead and/or changing the carriage scan speed.

However, implementing these different print modes is rather complicated and requires sophisticated programming techniques, precisely engineered mechanical parts, and many circuit components. Moreover, the print quality of a lower resolution machine which has a 300 dpi addressable print mode is not as good as the print quality of a true 600 dpi resolution machine where both smallest dot size and addressability are each equal to 600 dpi.

MIXED RESOLUTION PRINTING FOR COLOR AND MONOCHROME PRINTERS

RELATED APPLICATIONS

This application is related to the application filed as Ser. No. 08/145,367 on Oct. 29, 1993, U.S. Pat. No. 5,684,518 in the name of Gary M. Nobel, et al. entitled INTERCONNECT SCHEME FOR MOUNTING DIFFERENTLY CONFIGURED PRINTHEADS IN THE SAME CARRIAGE, which application is assigned to the assignee of this application and is incorporated herein by reference.

This application also relates to the following copending applications which are commonly owned by the assignee of this application, and which are incorporated herein by reference:

ELECTRICAL INTERCONNECT SYSTEM FOR A PRINTER filed as Ser. No. 08/56,345 on Apr. 30, 1993, U.S. Pat. No. 5,461,482 in the names of Arthur K. Wilson, et al.; MODULAR CARRIAGE ASSEMBLY FOR AN INKJET PRINTER filed as Ser. No. 08/55,618 on Apr. 30, 1993, abandoned in the names of Arthur K. Wilson, et al.; WIPING STRUCTURE FOR CLEANING ELECTRICAL CONTACTS FOR A PRINTER AND INK CARTRIDGE filed as Ser. No. 08/56,009 on Apr. 30, 1993, U.S. Pat. No. 5,598,194 in the names of Corrina A. E. Hall, et al. ; METHOD AND DEVICE FOR PREVENTING UNINTENDED USE OF PRINT CARTRIDGES filed as Ser. No. 08/56,961 on May 3, 1993, U.S. Pat. No. 5,519,442 in the names of Jeffrey A. Thoman, et al. ; SIDE BIASED DATUM SCHEME FOR INKJET CARTRIDGE AND CARRIAGE filed as Ser. No. 08/57,241 on Apr. 30, 1993, U.S. Pat. No. 5,646,665, in the names of David W. Swanson, et al. ; and PRINTHEAD WITH REDUCED INTERCONNECTIONS TO A PRINTER filed as Ser. No. 07/958,833 on Oct. 8, 1992, abandoned, in the names of Michael B. Saunders, et al.

BACKGROUND OF THE INVENTION

This invention relates generally to printers, and more specifically to printing devices and techniques for monochrome and color printers capable of achieving high quality resolution.

High quality printers are typically characterized by numbers indicating their resolution in dots per inch (dpi). This resolution is usually described in the context of a two dimension coordinate system where one number indicates the resolution in the x-axis (as used herein, x-axis means the carriage scan axis for a swath printer), and another number indicates the resolution in the y-axis (as used herein, y-axis means the media advance axis for a swath printer). Thus, a resolution of 300/300 dpi generally indicates a carriage-scan axis resolution of 300 dots per inch and a media-advance axis resolution of 300 dots per inch.

The resolution of a printhead is primarily determined by the actual printout dot size as it appears in a printout. So in the ideal theoretical world, a 300 dpi printhead is presumed to produce a printout dot size which is approximately 1/300th inch in diameter. But various common language usages have developed which define resolution in other closely related terms. For example, a printhead's resolution is often identified by its nozzle pitch (i.e., the distance between adjacent nozzles on a printhead), and a print mode resolution is often identified by its pixel addressability (i.e., the distance between adjacent pixels in a printout).

There are several print mode techniques for expanding the print quality characteristics of a printhead. For example, a

BRIEF SUMMARY OF THE INVENTION

It is a primary object of the invention to incorporate multiple resolution capabilities directly into the printer printheads in order to expand the capabilities of the printer to achieve high quality printing as well as greater throughput. A related object is to decrease research and development costs as well as decrease the time for bringing higher resolution printers to market.

Another important object of the invention is to incorporate multiple resolution capabilites directly into a color printer. A related object is to provide a color printer having one base printhead resolution for color printing and a different base printhead resolution for monochrome printing such as black printing. In the preferred form, a higher base printhead resolution is provided for monochrome printing and a lower base printhead resolution is provided for color printing.

A further object is to provide a printer having higher base resolution for its black printing component and a lower base resolution for its color printing components such as cyan, magenta and yellow. A related object is to integrate both of the aforesaid black and color printing components into the same printing mechanism in order to provide composite printing of higher resolution black and lower resolution color at the same time.

Another important feature of the invention is to provide increased throughput for the higher resolution monochrome component of the color printer. In the preferred form, a wider swath monochrome printhead such as a high resolution black printhead which produces approximately 600 dpi sized printout dots is mounted on the same carriage as narrower swath color printheads such as lower resolution cyan, magenta and yellow printheads which produce approximately 300 dpi sized printout dots, with the wider swath black printhead having overlapping printing alignment with all of the narrower swath color printheads. The wider swath black printhead has a 300 nozzle swath with a nozzle pitch of 1/600th inch to create a swath of approximately one-half inch, and the narrower swath color printheads each have a 100 nozzle swath with a nozzle pitch of 1/300th inch to create a swath of approximately one-third inch.

DETAILED DESCRIPTION OF THE PREFERRED EMBODIMENT

In a multiple pen printer, it is important to improve the output quality of a printed page and increase the speed at which that output can be obtained as economically and simply as possible. In a printer mechanism, the output quality of a printed page is a function of printhead resolution. The higher the resolution the better the print quality. Also, in a swath printer employing a scanning carriage, the speed at which the output can be obtained is a function of the width of the swath which is covered by the printhead.

In current multi-pen printers, each pen has the same resolution and usually the same swath width. This means that all the supporting structure, mechanics and electronics needs to be scaled up to support the resolution of the entire set of pens. All this hardware is more expensive than the hardware to support a multi-resolution, multi-swath width pen set where one pen is at the higher resolution and larger width that is desired and the other pens in the set are at a lower resolution and smaller size.

This invention provides the benefits of a higher resolution, larger swath pen in lower resolution, smaller swath pens in the same printing machine. The higher performance pen can be used to improve output quality by enhancing certain key features that appear frequently in a printed page such as text. Such a pen also improves thoughput by being able to print these frequent features faster. The other lower performance pens can be used for less frequent or less demanding features such as graphics.

In the presently preferred embodiment of the invention disclosed herein, we have combined a 600 dpi ½ inch swath black pen with three 300 dpi color pens each generating a swath of approximately ⅓ inch. The high performance black pen is typically used for printing text and other "black only" features, and thus the output quality and throughput of these features is greater. It also improves the output quality of color graphics and color features by teaming with the three lower performance color pens when printing color graphics or color features. The black component of the graphics which is often a large portion of color graphics content is at a higher resolution and thus at a higher output quality level. The larger swath can then be combined with printing algorithms to improve the throughput of color graphics.

Figure 1:
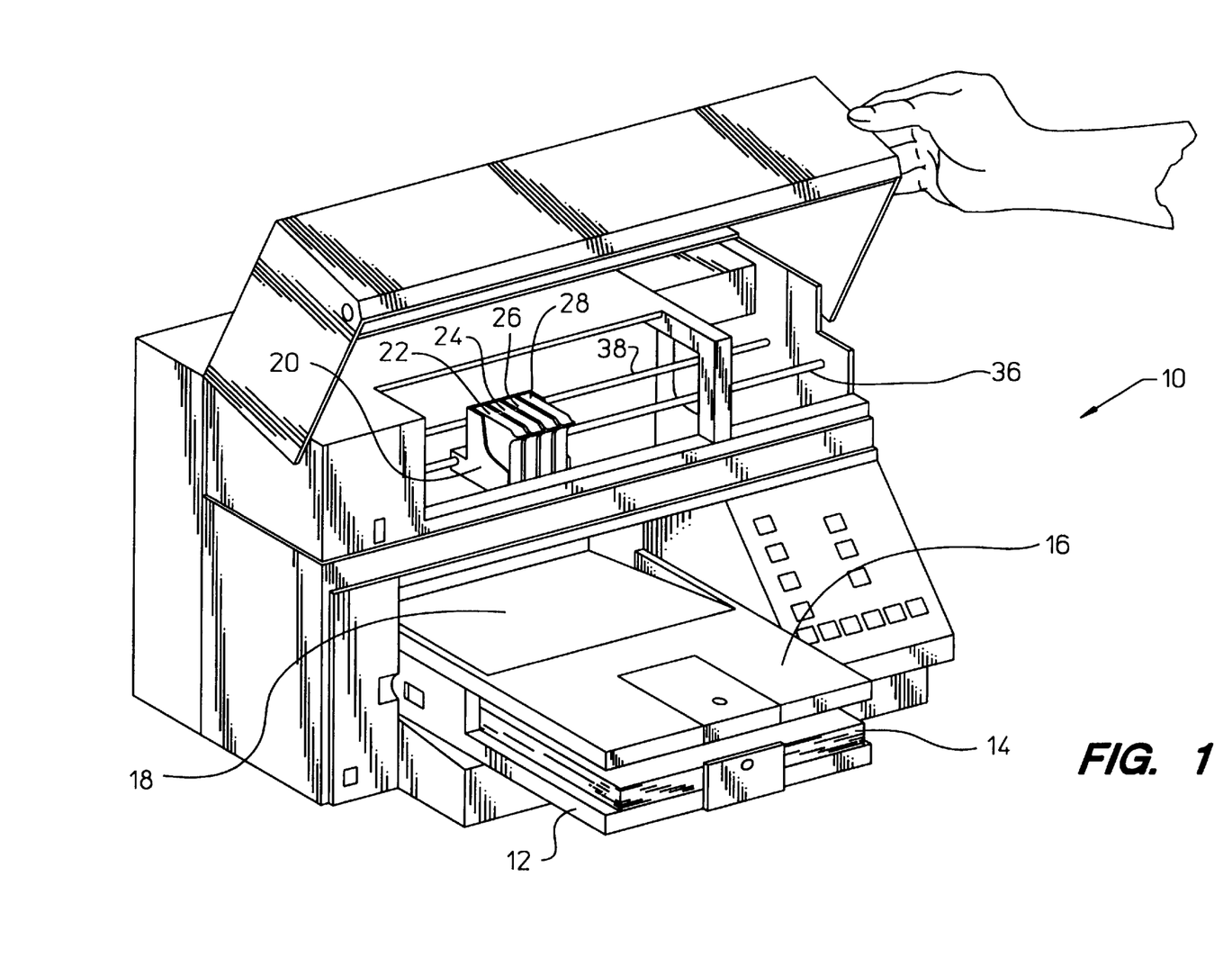
FIG. 1 shows a typical inkjet printer which can incorporate the apparatus and method of the present invention.
Figure 2:
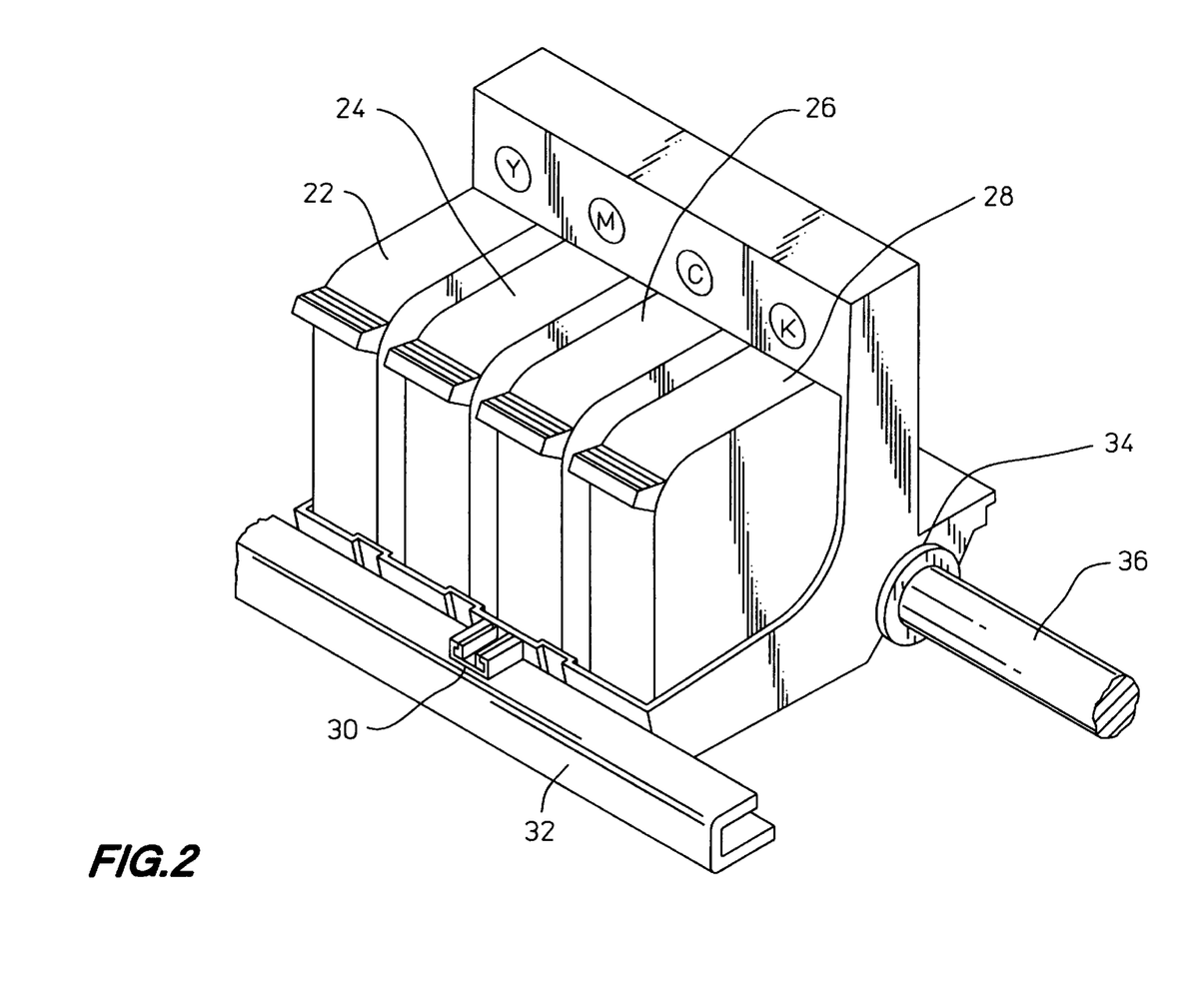
FIG. 2 shows a carriage having removable multi-color print cartridges, which can incorporated the apparatus and method of the present invention.
Figure 3:
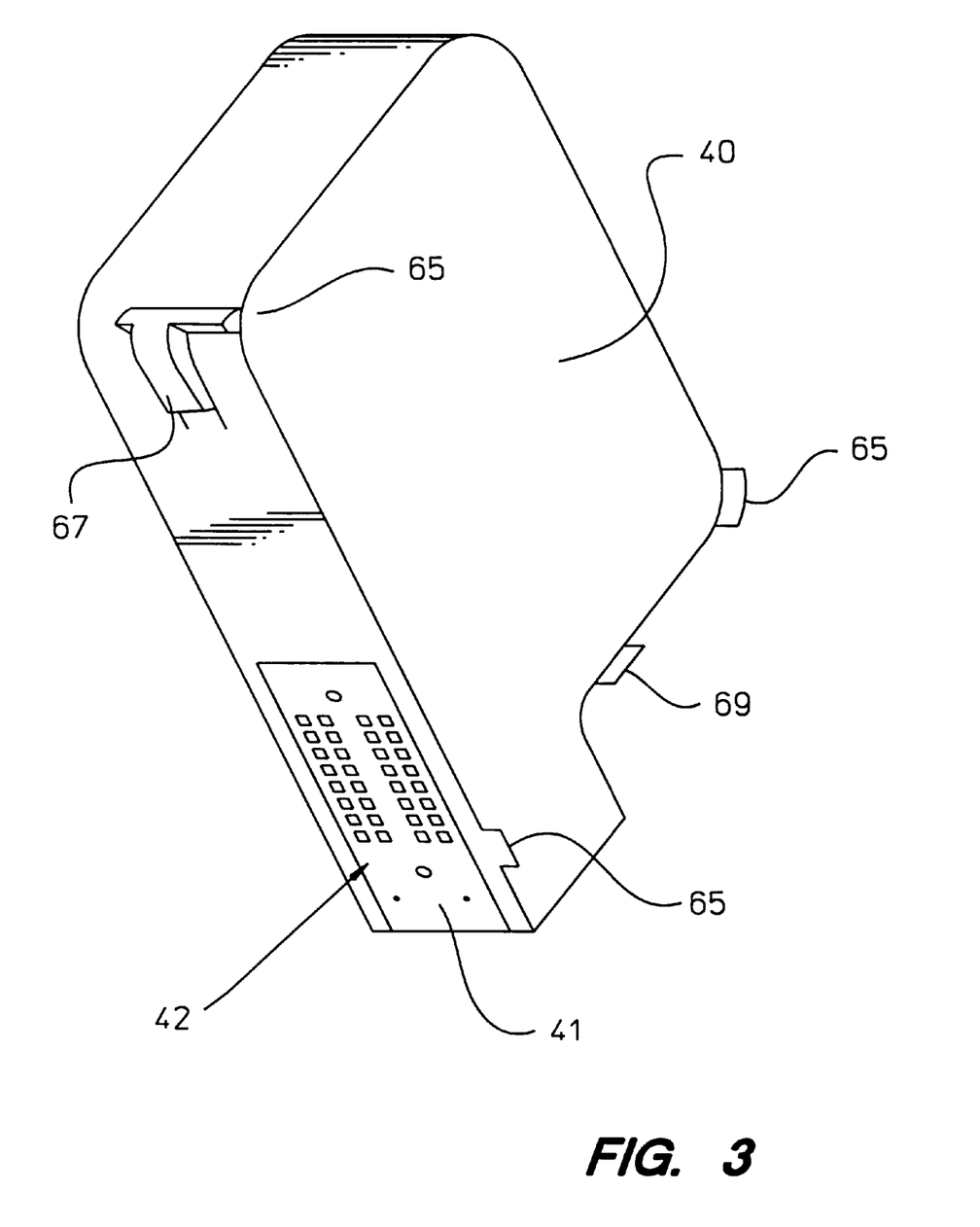
FIG. 3 shows an exemplary lower resolution color inkjet print cartridge used in a presently preferred embodiment of the invention.
Figure 4:
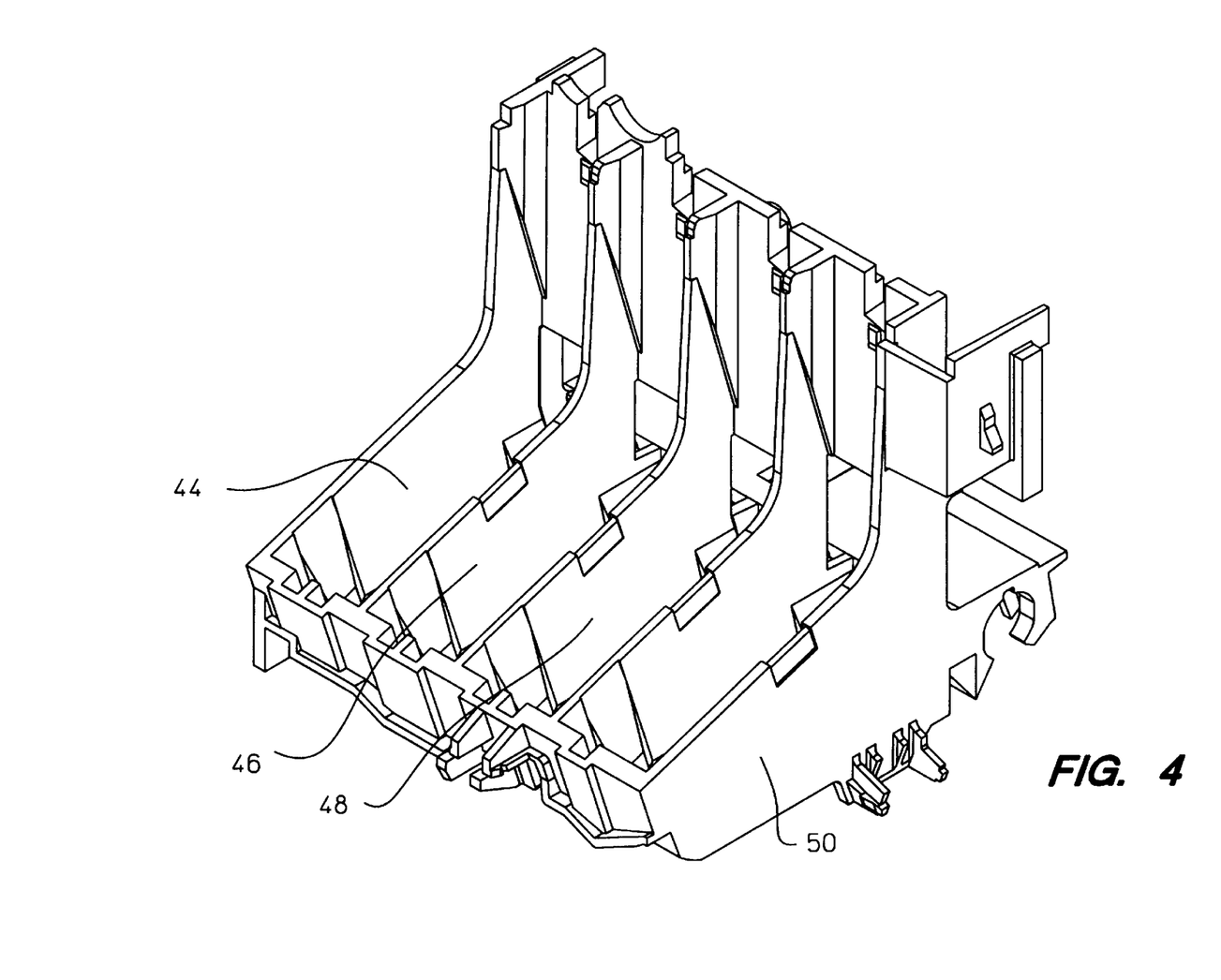
FIG. 4 is a perspective view of a carriage incorporating presently preferred embodiment of the invention in an inkjet printer.
Figure 5:
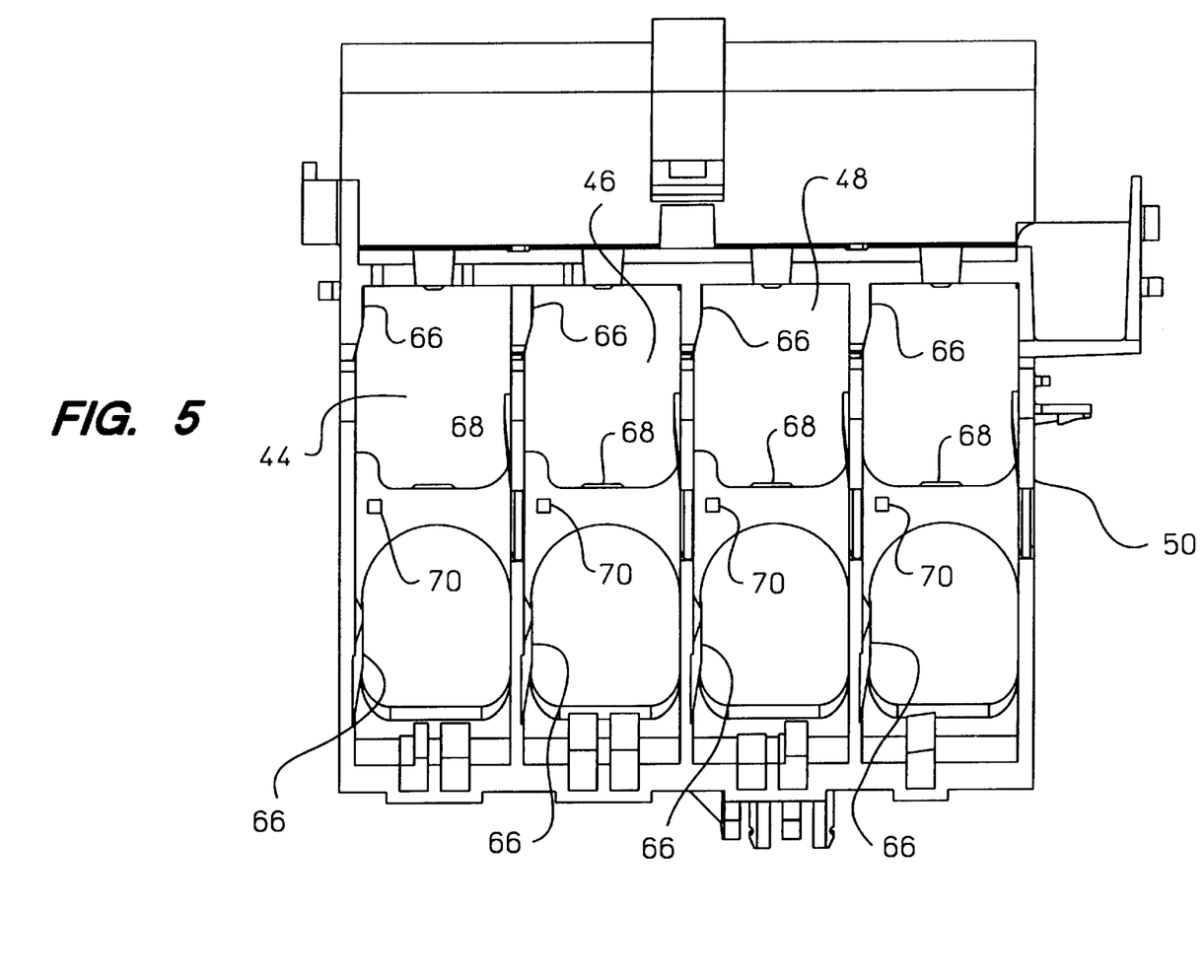
FIG. 5 is a top view of the carriage of FIG. 4.
Figure 6:
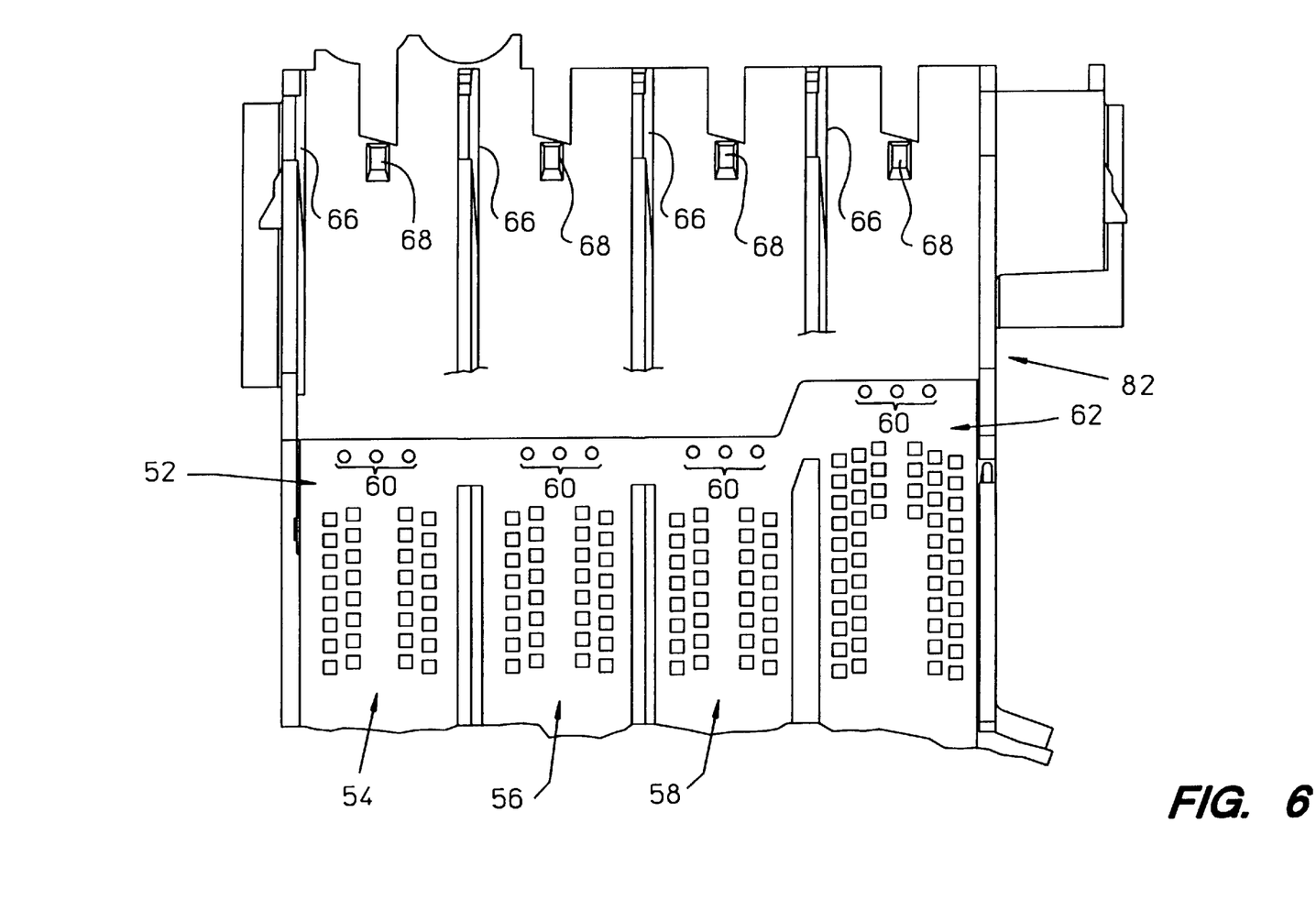
FIG. 6 is a fragmentary view of the flex-circuit interconnect on the carriage of FIGS. 4 and 5, with the interior carriage walls cut away; .

Even though the invention can be used in any printing environment where text and/or graphics are applied to media using monochrome and/or color comoponents, the presently preferred embodiment of the invention is used in an inkjet printer of the type shown in FIG. 1. In particular, inkjet printer 10 includes an input tray 12 containing sheets of media 14 which pass through a print zone, and are fed past an exit 18 into an output tray 16. Referring to FIGS. 1–2, a movable carriage 20 holds print cartridges 22, 24, 26, and 28 which respectively hold yellow (Y), magenta (M), cyan (C) and black (K) inks. The front of the carriage has a support bumper 30 which rides along a guide 32 while the back of the carriage has multiple bushings such as 34 which ride along slide rod 36. The position of the carriage as it traverses back and forth across the media is determined from an encoder strip 38 in order to be sure that the various ink nozzles on each print cartridge are selectively fired at the appropriate time during a carriage scan.

Referring to FIGS. 3–6, a 300 dpi color inkjet cartridge 40 having a tab-circuit with a four column thirty-two pad electrical interconnect 42 is removably installed in three chutes 44, 46, 48 of a unitary carriage 50. A flex-circuit member 52 having three matching sets of conductive pads 54, 56, 58 is mounted on flex-frame pins 60 for operative engagement with the cartridge pads when the cartridge is inserted into its appropriate chute. An enlarged set of conductive pads 62 covering a larger area, having a different layout, and constituting an array of six columns totaling fifty-two conductive pads on the flex-circuit member is designed for operative engagement with cartridge pads on a 600 dpi black injet cartridge 64 (see FIG. 9).

The preferred structure and techniques for preventing mistaken installation of a 600 dpi black printhead in a color printhead chute, or alternatively the mistaken installation of a 300 dpi color printhead in a black printhead chute is described in the copending applications identified above and incorporated by reference herein.

Because of the differently configured electrical interconnect on the 600 dpi cartridge, and in order to avoid substantially changing the existing X/Y/Z datum configuration of the carriage, a unique interconnect scheme is employed. In that regard, the X-axis cartridge datums 65 engage the X-axis carriage datums 66, and the Y-axis cartridge datums 67 engage the Y-axis carriage datums 68, and the Z-axis cartridge datums 69 engage the Z-axis carriage datums 70 in a manner more fully described in the copending applications identified above and incorporated by reference herein.

Figure 9:
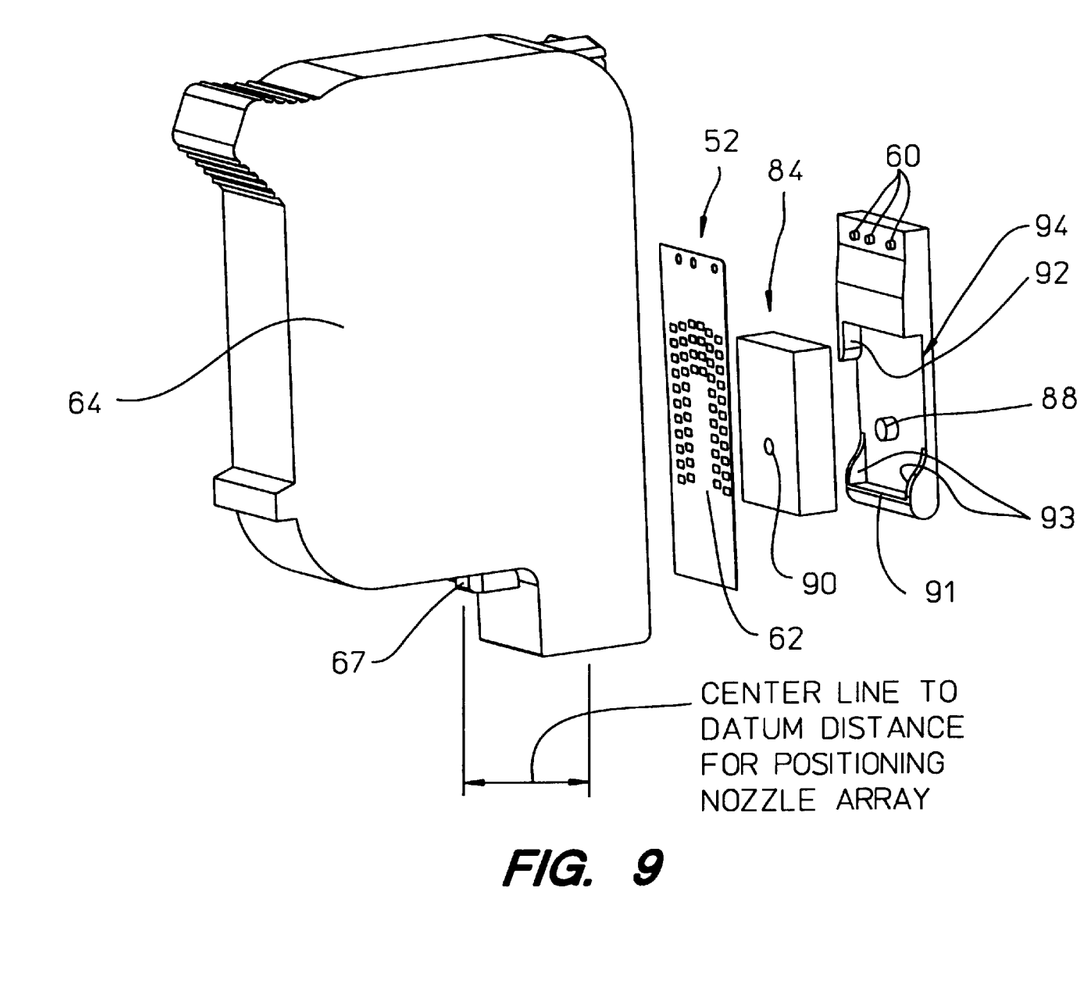
FIG. 9 is a schematic view showing the use of a foam member for operatively connecting a flex-circuit to a higher resolution black inkjet cartridge.
Figure 10:
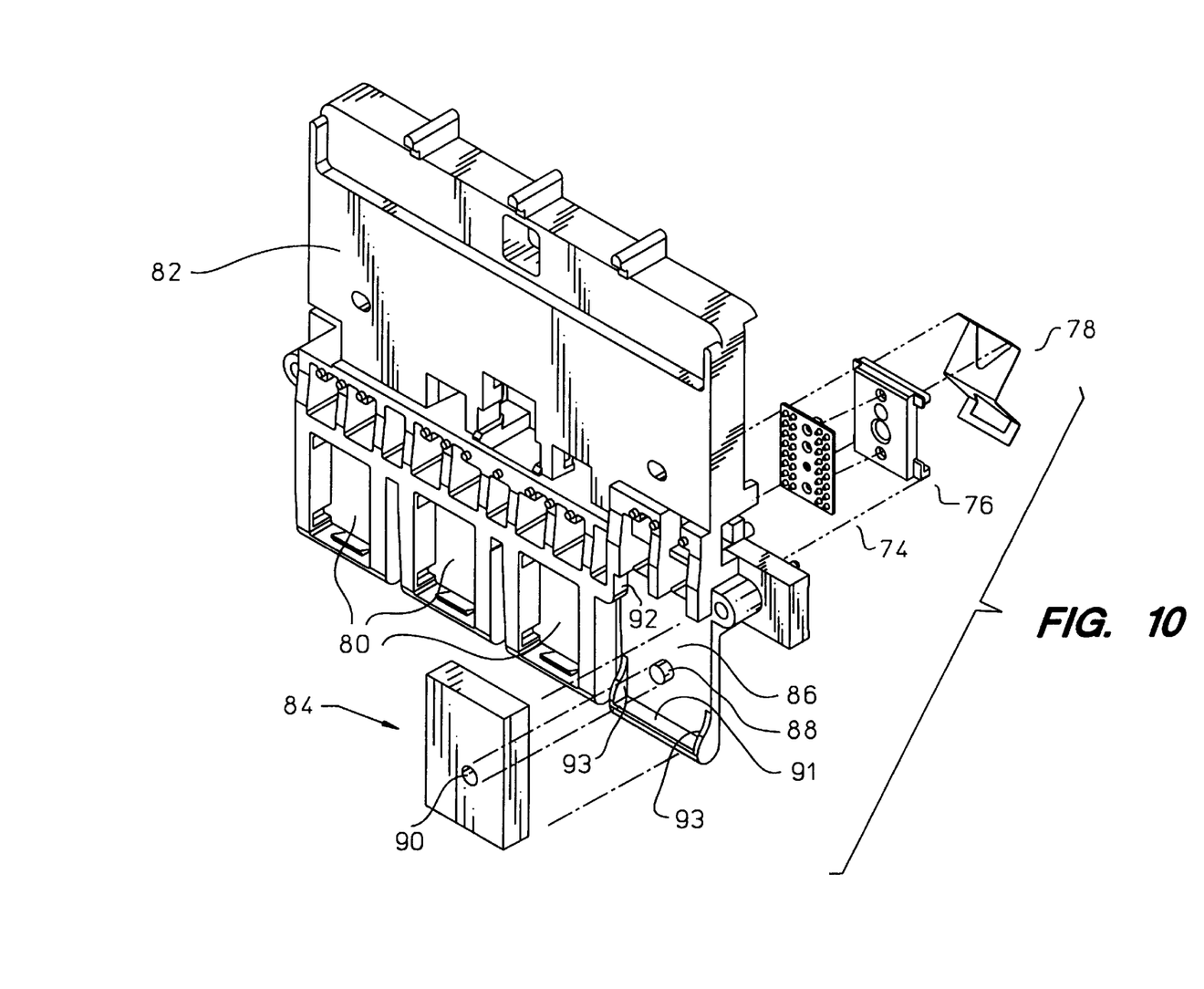
FIG. 10 is an exploded view showing. a flex-circuit frame portion of a carriage, with the foam spring member of FIG. 9 for assuring pressure connection of a flex-circuit to a higher resolution black inkjet cartridge, and a metal spring member for assuring pressure connection of a flex-circuit to lower resolution color inkjet cartridges.
Figure 11:
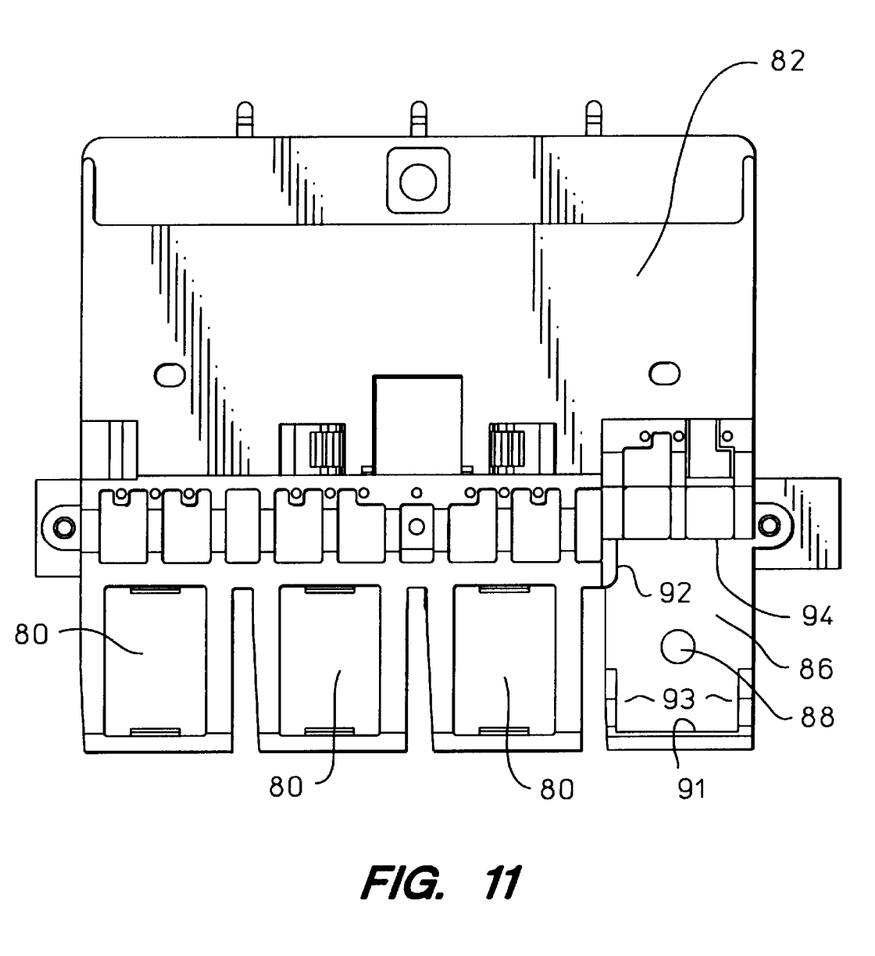
FIG. 11 is a front view of the flex-circuit frame of FIG. 10.

As best shown in FIGS. 9–11, a previously existing spring assembly including a backing sheet 74, a plate 76 and a gimbal spring 78 are sized for fitting into apertures 80 of flex-circuit frame 82 to assure proper electrical interconnection for the three color cartridges. Such resilient structure is described more fully in copending applications identified above and incorporated herein by reference.

A unique spring assembly for the 600 dpi cartridge interconnect includes an unitary resilient foam member 84 which fits in a seat 86 which is larger than the aperture 80.

A mounting peg 88 fits into matching hole 90 which along with bottom and lower ledges 91, 93 and upper side and top ledges 92, 94 hold the foam member in proper position to assure operative engagement across the electrical interconnect. The structure and function of the flex-circuit frame, which has been modified to incorporate the unique features of the present invention, is described more fully in copending applications identified above and incorporated herein by reference.

Figure 7:
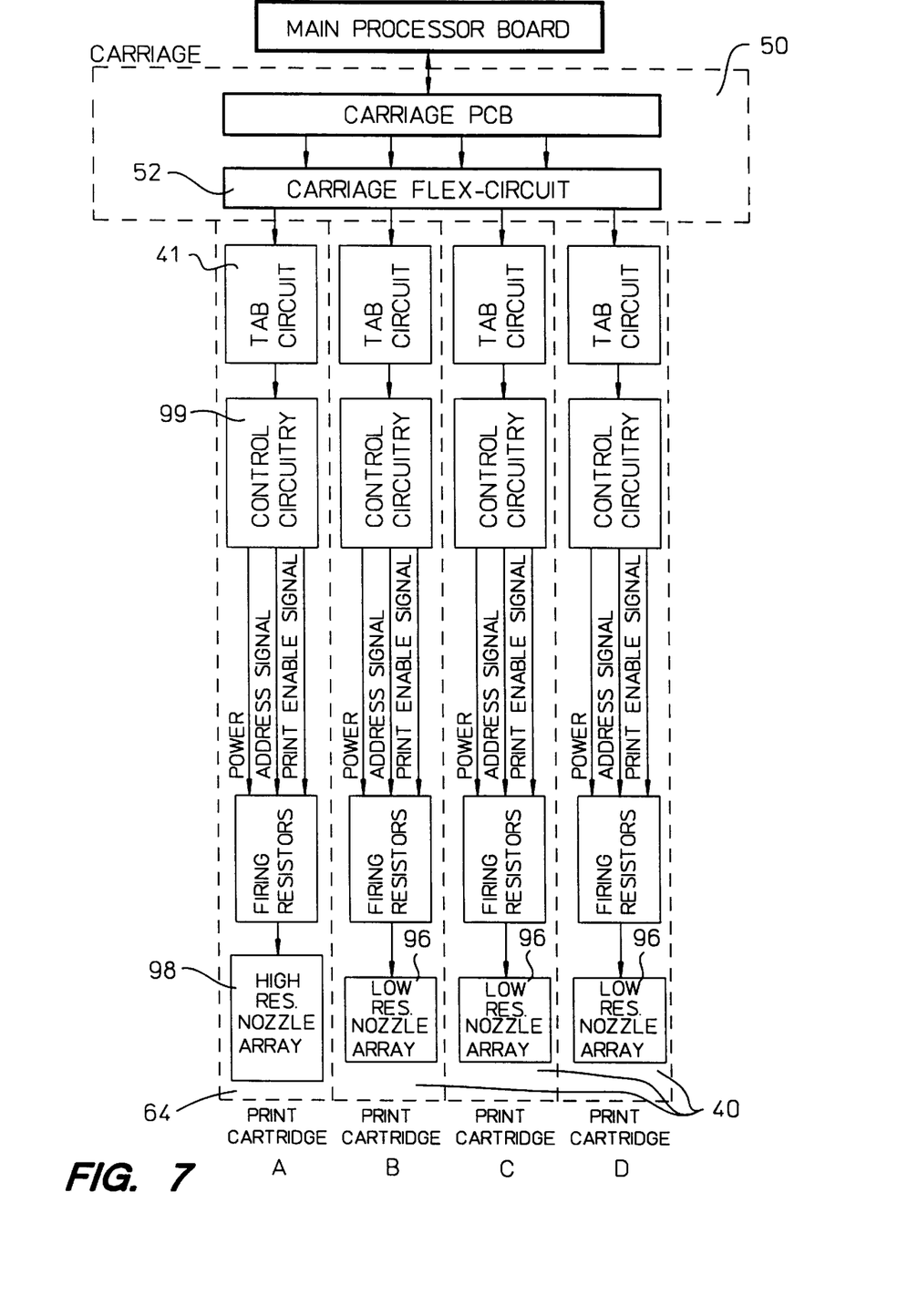
FIG. 7 is a schematic block diagram of the presently preferred embodiment of the invention.
Figure 8:
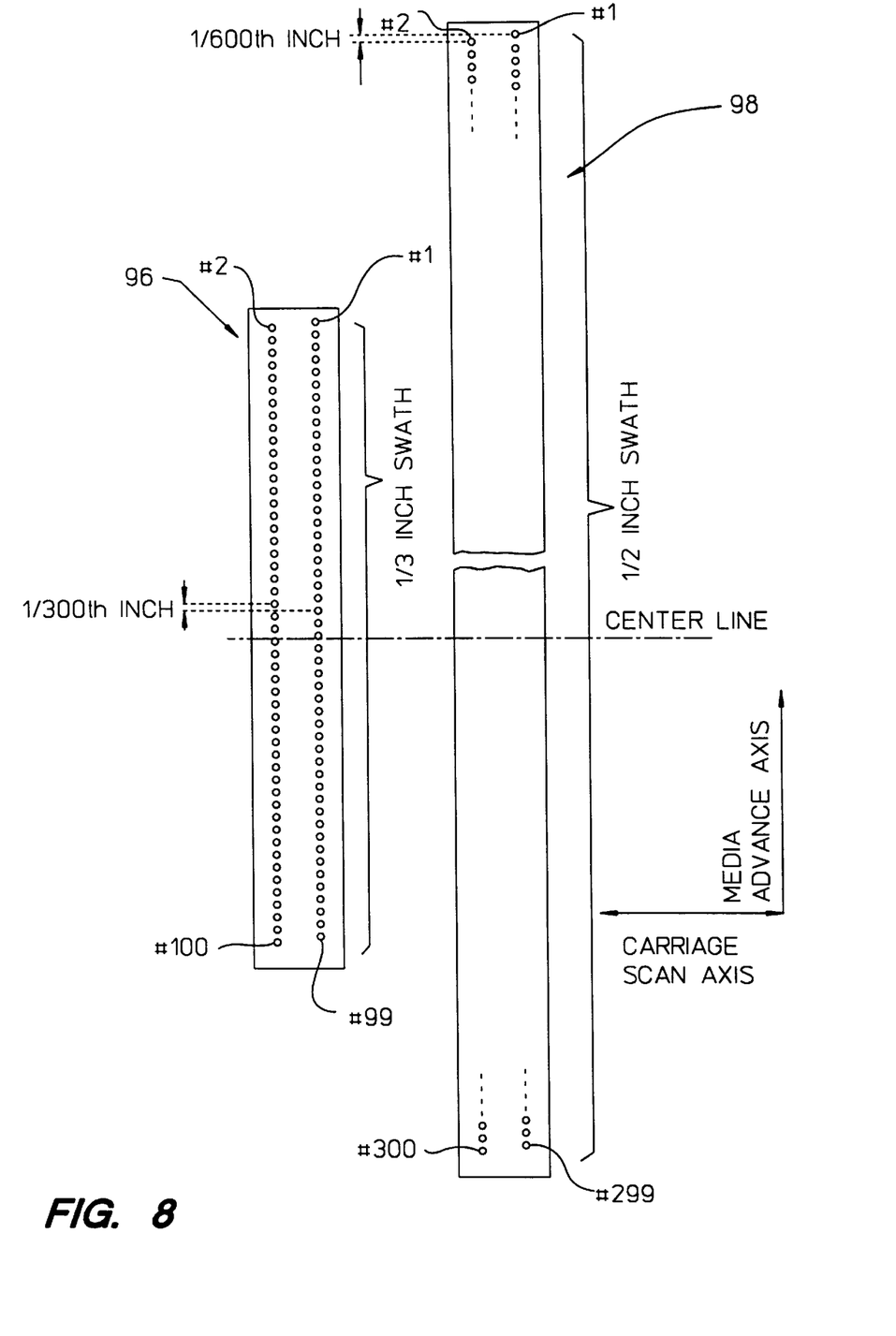
FIG. 8 is a schematic bottom view as seen looking up from the media showing the alignment relationship of the nozzle arrays of FIG. 7.

FIGS. 7–8 show the preferred mounting relationship between a 300 dpi nozzle array 96 of the color printheads and a 600 dpi nozzle array 98 of the black printhead. Control circuitry 99 on the substrate enables the three hundred firing resistors of the black printhead to be controlled through fifty-two electrical interconnect pads, and similarly enables all one hundred four firing resistors of each color printhead to be controlled through thirty-two electrical interconnect pads. The multiplexing circuit scheme for such control circuitry is described more fully in copending applications identified above and incorporated herein by reference.

Figure 12:
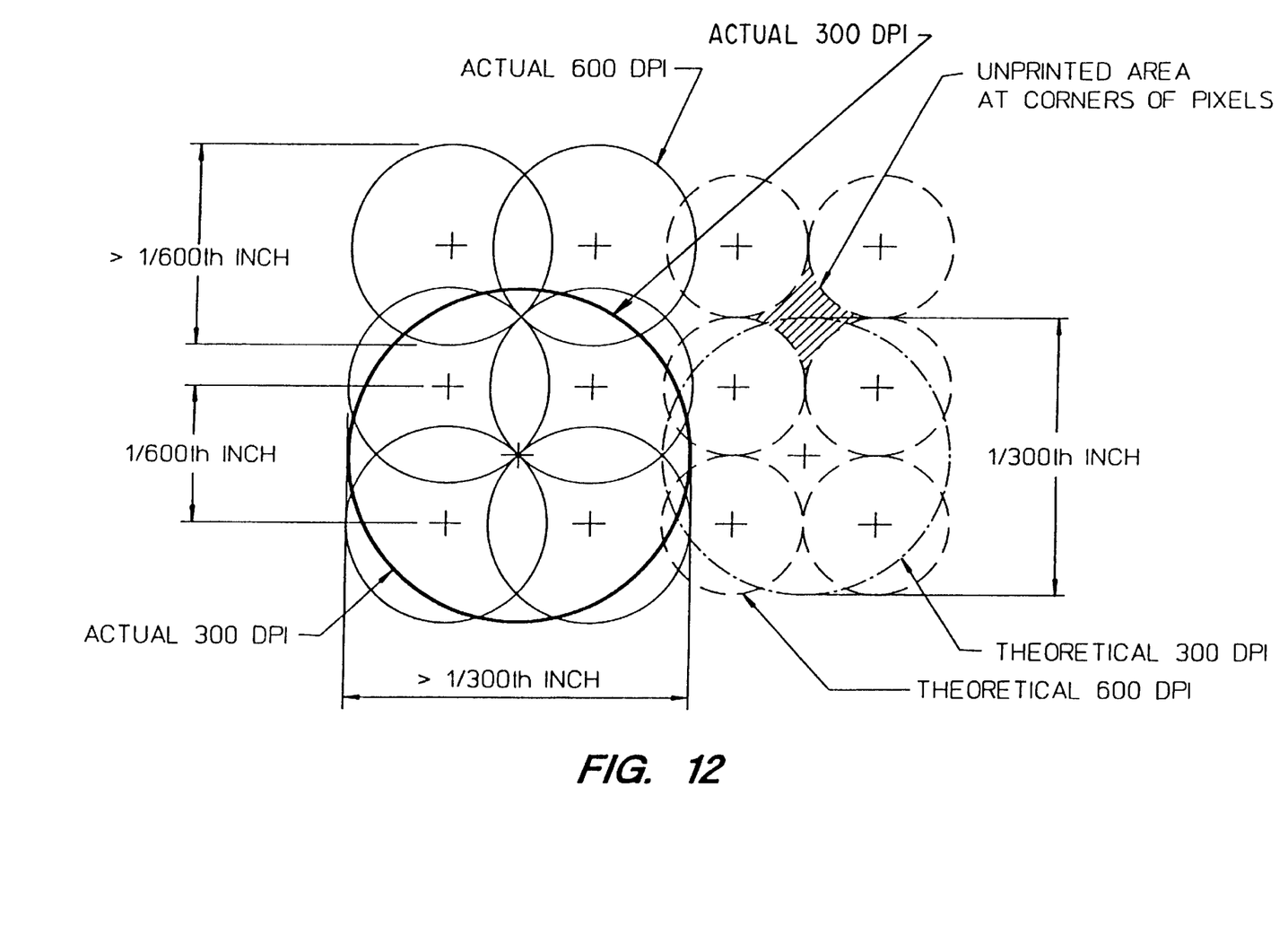
FIG. 12 is a schematic diagram showing the relative resolution between a 600 dpi printout of the black printheads and a 300 dpi printout of the color printheads of a presently preferred embodiment of the invention.

FIG. 12 schematically shows the difference between the 300 dpi printout produced by the color pens (i.e., pen cartridges) and the 600 dpi printout of the black pen of the preferred embodiment described herein. Of course, it would be possible to incorporated different combinations of resolution in different printheads wherein the resolution difference may be arbitrary, depending on the printheads available and already developed, or wherein the resolution difference may be decimally related (e.g., 20% greater resolution, 30% greater resolution, etc.) or fractionally related (300 dpi with 400 dpi; 300 dpi with 450 dpi, etc.). In that regard, the invention can be implemented with any of the existing inkjet cartridges which are currently available, with the best results occurring with printheads in the range of 180 dpi or greater.

It will therefore be appreciated by those skilled in the art that the invention as shown and described herein allows different types of interconnects and different types of print cartridges such as cartridges of different print resolutions to be used in one product.

This invention allows higher resolution and speed to occur for frequently printed features such as text and the most frequent color components of graphics such as black. Thus by printing these frequent features and components faster and at a higher resolution, the entire page is faster and of higher quality and is more comprable with laser printing performance (8+ pages per minute) and laser printing quality (600 dpi resolution).

The new form of resilient interconnect member disclosed herein allows for optimization and customization for the particular contact pattern of different cartridges in the same carriage. Thus, the size of the carriage and the way that the cartridge is held in the carriage has to change very little between subsequent generations of printers. In other words, the required design change to the printer is minimized, the carriage does not have to grow wider nor taller, and the printer does not have to grow wider nor taller.

While specific illustrated embodiments have been shown and described, it will be appreciated by those skilled in the art that various modifications, changes and additions can be made to the methods, structures and apparatus of the invention without departing from the spirit and scope of the invention as set forth in the following claims.

We claim as our invention:

1. A mixed-resolution printer for printing images in plural colors on print media; said printer comprising:
  a frame for holding media in a print zone;
  a carriage supported on the frame adjacent to the print zone for traversing the media along a carriage-scan axis;
  means, supported on the frame, for establishing a media-advance axis that is fixed with respect to the frame and is substantially at right angles to the carriage-scan axis, and for providing relative motion between the media and the carriage, along the media-advance axis;
  first printing means, comprising a first printhead, for printing an entire first-color portion of an image and having a first print resolution, said first printing means being capable of no finer resolution, in a single print pass, than said first print resolution; said entire first-color portion being as distinguished from merely filling in unprinted space between dots printed in the same first color by other printing means; and said printer having no first-color printhead other than the first printhead of the first printing means;
  second printing means, comprising a second printhead, for concurrently printing an entire second-color portion of the image, said second-color portion being a different color than said first color, while the first printhead prints at the first print resolution, and having a second print resolution lower than the first print resolution; said entire second-color portion being as distinguished from merely filling in unprinted space between dots printed in the same second color by other printing means; said second printing means being capable of no finer resolution, in a single print pass, than said second resolution; and said printer having no second-color printhead other than the second printhead of the second printing means; and
  means for mounting the first and second printheads on the carriage for composite printing by the first and second printheads on the media in the print zone.

2. The mixed-resolution printer of claim 1, wherein:
  said first printhead includes a black printhead, which has said first resolution; and
  said second printhead includes a chromatic-color printhead, which has said second resolution.

3. The mixed-resolution printer of claim 2, wherein:
  said second printhead is for printing in at least one color selected from a group consisting of cyan, magenta, yellow, red, green and blue.

4. The mixed-resolution printer of claim 2, wherein:
  said first resolution of said black printhead is higher than the aforesaid second resolution of said color print-head.

5. The mixed-resolution printer of claim 2, wherein:
  said color printhead has a printing swath having a width; and
  said black printhead has a printing swath that is substantially wider than the printing swath of said color printhead.

6. The mixed resolution printer of claim 1, wherein:
  said first printhead has a first nozzle pitch as measured parallel to the media-advance axis;
  said second printhead has a second nozzle pitch as measured parallel to the media-advance axis; and
  said first nozzle pitch is less than said second nozzle pitch.

7. The mixed-resolution printer of claim 1, wherein:
  said first printhead includes a color component which is different from a color component of said second printhead.

8. The mixed-resolution printer of claim 1, wherein:
  said mounting means comprise means for mounting said first and second printheads in relative positions, along the media-advance axis, which produce at least partially overlapping print swaths from said printheads.

9. The mixed-resolution printer of claim 1, wherein:

said first printhead has a first print resolution greater than said second print resolution of said second printhead;

said second printhead has a print swath having a width; and said first printhead has a print swath that is substantially wider than the print swath of said second printhead.

10. The mixed-resolution printer of claim 9, wherein:

said mounting means comprise means for mounting said second printhead in completely overlapped printing alignment with said first printhead.

11. The mixed resolution printer of claim 9 wherein said first printhead includes a black component.

12. The mixed resolution printer of claim 11 wherein said second printhead includes a color component selected from the group consisting of cyan, magenta, yellow, red, green, and blue.

13. A mixed-resolution printer for printing images in plural colors on print media; said printer comprising:

a frame including means for establishing a media-advance axis that is fixed with respect to the frame, and for advancing media along the media-advance axis through a print zone;

a carriage mounted on the frame for traversing the print zone, along a carriage-scan axis that is substantially at right angles to the media-advance axis;

first printing means, including a black component, for printing an entire black portion of an image at a first print resolution, said first printing means being capable of no finer resolution, in a single print pass, than said first print resolution; said entire black portion being as distinguished from merely filling in unprinted space between dots printed in black by other printing means; and said printer having no black printhead with a finest resolution different from the first print resolution;

second printing means, including a chromatic-color component, for concurrently printing an entire chromatic-color portion of the image at a second print resolution lower than said first print resolution, said second printing means being capable of no finer resolution, in a single print pass, than said second resolution; said entire chromatic-color portion being as distinguished from merely filling in unprinted space between dots printed in a same said chromatic color by other printing means; and said printer having no chromatic-color printhead with a finest resolution different from the second print resolution; and means for mounting said first and second print means on said carriage for composite printing by the first and second printheads on the media in the print zone.

14. The mixed resolution printer of claim 13 wherein said second print means includes three different color printheads.

15. The mixed-resolution printer of claim 13, wherein:

said first printing means and second printing means are mounted on the carriage adjacent to one another, but staggered along the media-advance axis to produce at least partially overlapping printing swaths from said first printing means and second printing means.

16. The mixed resolution printer of claim 13, wherein:

said first printing means comprise a printhead having a first nozzle pitch;

said second printing means comprise a printhead having a second nozzle pitch; and said first nozzle pitch is less than said second nozzle pitch as measured parallel to said media advance axis.

17. The mixed resolution printer of claim 13, wherein:

said first printing means and second print means each have respective multiple image-forming devices spaced parallel to the media-advance axis for providing said first print resolution and second print resolution respectively;

said first and second print resolutions have respective values expressed in terms of pixel rows per unit distance parallel to the media advance axis; and said first print resolution is at least 20 percent higher than said second print resolution.

18. the mixed-resolution printer of claim 13, wherein:

said first printing means and second printing means have multiple image-forming devices spaced parallel to the media-advance axis for providing said first print resolution and second print resolution respectively;

said first print resolution and second print resolution have respective values expressed in terms of pixel rows per unit distance parallel to the media-advance axis; and said first print-resolution value is at least 50 percent higher than said second print-resolution value.

19. The mixed-resolution printer of claim 13, wherein:

said first printing means and second printing means have multiple image-forming devices spaced parallel to the media-advance axis for providing said first print resolution and second print resolution respectively;

said first print resolution and second print resolution have respective values expressed in terms of pixel rows per unit distance parallel to the media-advance axis; and said first print resolution is at least 100 percent higher than said second print resolution.

20. The mixed-resolution printer of claim 13, wherein:

said second print resolution is 7.1 pixel rows per millimeter (180 pixel rows per inch), as measured parallel to the media-advance axis.

21. The mixed-resolution printer of claim 13, wherein:

said first print resolution is 7.9 pixel rows per millimeter (200 pixel rows per inch), as measured parallel to the media-advance axis.

22. The mixed-resolution printer of claim 16, wherein:

said first and second printing means are mounted on the carriage adjacent to one another, but staggered along the media-advance axis to produce at least partially overlapping print swaths from said printheads.

23. The mixed-resolution printer of claim 16, wherein:

said second printing means have a printing swath having a width; and said first print means have a substantially wider print swath that said second print means have.

24. The mixed-resolution printer of claim 13, wherein:

said second printing means have a printing swath having a width;

said first printing means have a substantially wider printing than said second print means have; and said first print means are mounted in said carriage so that said wider print swath with said black component is capable of completely overlapping a print swath of said color component of said second printing means.

25. The mixed resolution printer of claim 13 wherein said first printing means includes a first printing cartridge having a first electrical interconnect;

said second printing means includes a second printing cartridge having a second electrical interconnect;

said carriage includes means for removably mounting said first and second print cartridges on said carriage.

26. The mixed resolution printer of claim 25 wherein said first electrical interconnect is different from said second electrical interconnect, and wherein said carriage further includes first resilient means for operatively engaging said first electrical interconnect when said first print cartridge is mounted on said carriage; and second resilient means for operatively engaging said second electrical interconnect when said second print cartridge is mounted on said carriage.

27. The mixed resolution printer of claim 26 wherein said first resilient means includes foam means for operatively engaging said first electrical interconnect, and said second resilient means includes spring means for operatively engaging said second electrical interconnect, said spring means being different from said foam means.

28. A method a mixed-resolution printing of images in plural colors, comprising the steps of:

applying, with a first printing means, a first monochrome printed component, having a first resolution, to a given area on media in a print zone to produce an entire first-monochrome component being as distinguished from merely filling in unprinted space between dots printed in a same first monochrome color by other printing means; and concurrently applying, with a second printing means, a second monochrome printed component, having a different color than the first monochrome component and having a second resolution less than first resolution to produce an entire second-monochrome component of the image, said entire second-monochrome component being as distinguished from merely filling in unprinted space between dots printed in a same second monochrome color by other printing means, to said given area on the media to create composite mixed resolution printout.

29. The method of claim 28 wherein said first monochrome component includes a black component, and wherein said second monochrome component includes a color component selected from the group consisting of cyan, magenta, yellow, red, green, and blue.

30. The method of claim 28 for achieving mixed resolution printing in a swath printer, wherein both of said applying steps occur on the same swath.

31. The method of claim 28 for achieving mixed resolution printing in an inkjet printer, wherein said first monochrome component includes a black component, and wherein said second monochrome component includes a separate cyan component, a separate magenta component, and a separate yellow component.

* * * * *

UNITED STATES PATENT AND TRADEMARK OFFICE
CERTIFICATE OF CORRECTION

PATENT NO. : 5,949,453

DATED : September 7, 1999

INVENTOR(S) : Harris et al.

It is certified that error appears in the above-identified patent and that said Letters Patent is hereby corrected as shown below:

Column 8, line 57, after "printing", insert --swath--.

Signed and Sealed this

Twenty-fifth Day of April, 2000

Attest:

*Attesting Officer*

Q. TODD DICKINSON

*Director of Patents and Trademarks*